Dec. 10, 1946.  W. H. NEWELL  2,412,468
VARIABLE SPEED DEVICE
Filed May 5, 1945   7 Sheets-Sheet 1

Fig. 1

INVENTOR
William H. Newell
ATTORNEY

Dec. 10, 1946. W. H. NEWELL 2,412,468
VARIABLE SPEED DEVICE
Filed May 5, 1945 7 Sheets-Sheet 2

INVENTOR
William H. Newell
ATTORNEY

Dec. 10, 1946. W. H. NEWELL 2,412,468
VARIABLE SPEED DEVICE
Filed May 5, 1945 7 Sheets-Sheet 4

INVENTOR
William H. Newell
ATTORNEY

Dec. 10, 1946.  W. H. NEWELL  2,412,468
VARIABLE SPEED DEVICE
Filed May 5, 1945  7 Sheets-Sheet 5

INVENTOR
William H. Newell
ATTORNEY

Dec. 10, 1946.　　　W. H. NEWELL　　　2,412,468
VARIABLE SPEED DEVICE
Filed May 5, 1945　　　7 Sheets-Sheet 6

Fig. 8

INVENTOR
William H. Newell
ATTORNEY

Dec. 10, 1946.     W. H. NEWELL     2,412,468
VARIABLE SPEED DEVICE
Filed May 5, 1945     7 Sheets-Sheet 7

INVENTOR
*William H. Newell*
ATTORNEY

Patented Dec. 10, 1946

2,412,468

UNITED STATES PATENT OFFICE 2,412,468

VARIABLE SPEED DEVICE

William H. Newell, New York, N. Y., assignor to Ford Instrument Company, Inc., Long Island City, N. Y., a corporation of New York Application May 5, 1945, Serial No. 592,136

17 Claims. (Cl. 74—193)

This invention relates to variable speed devices of the frictional type and has for an object to provide a mechanical integrator having novel and improved features of operation and details of construction.

Another object is to provide an integrator of relatively simple, compact construction.

Another object is to provide an integrator which is accurate and dependable in operation.

Various other objects and advantages will be apparent as the nature of the invention is more fully disclosed.

Although the novel features which are believed to be characteristic of this invention are pointed out more particularly in the claims, the nature of the invention will be better understood by referring to the following description, taken in connection with the accompanying drawings in which certain specific embodiments thereof have been set forth for purposes of illustration.

Figure 1:
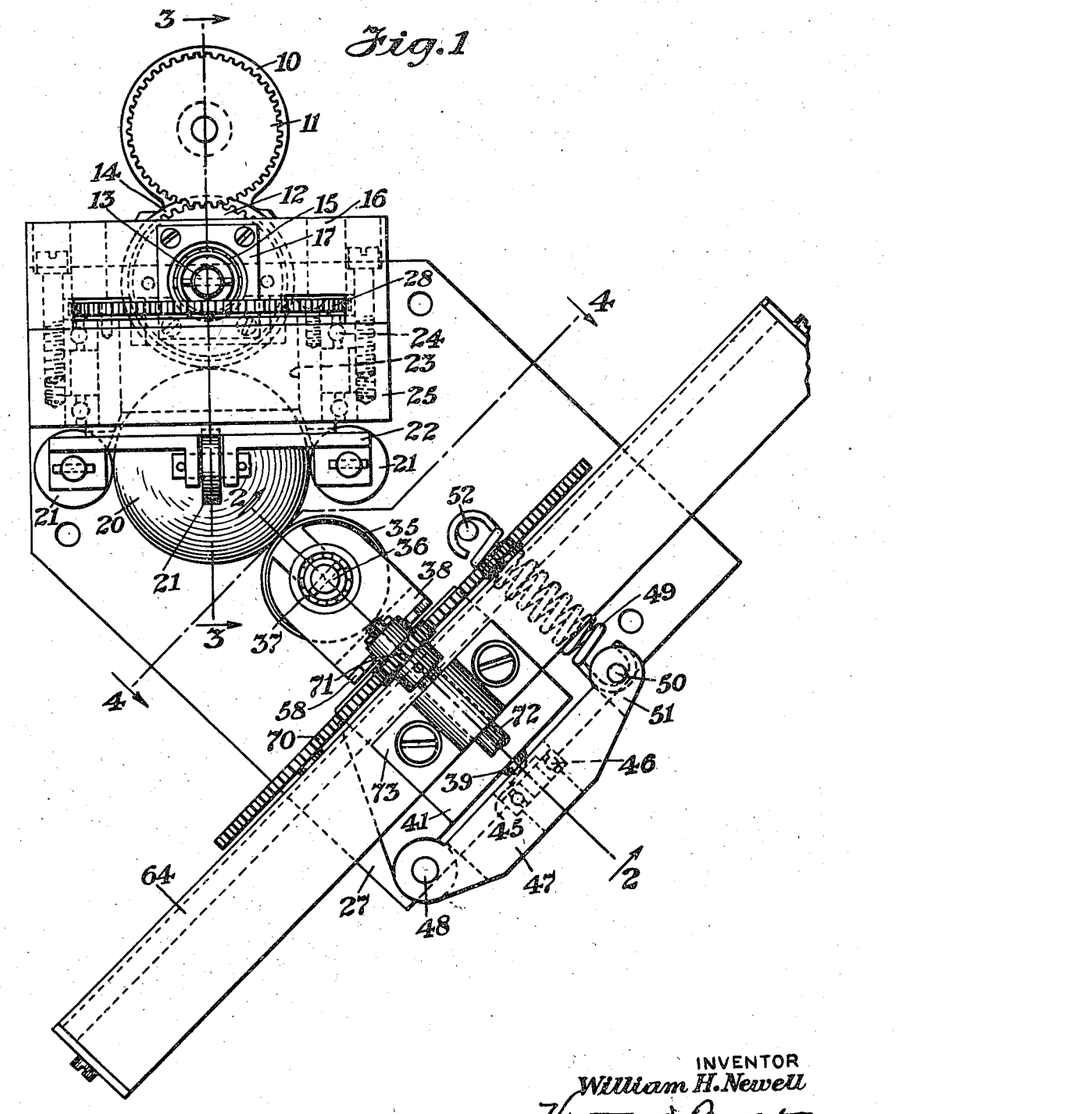
Fig. 1 is a plan view of a ball integrator embodying the present invention.
Figure 3:
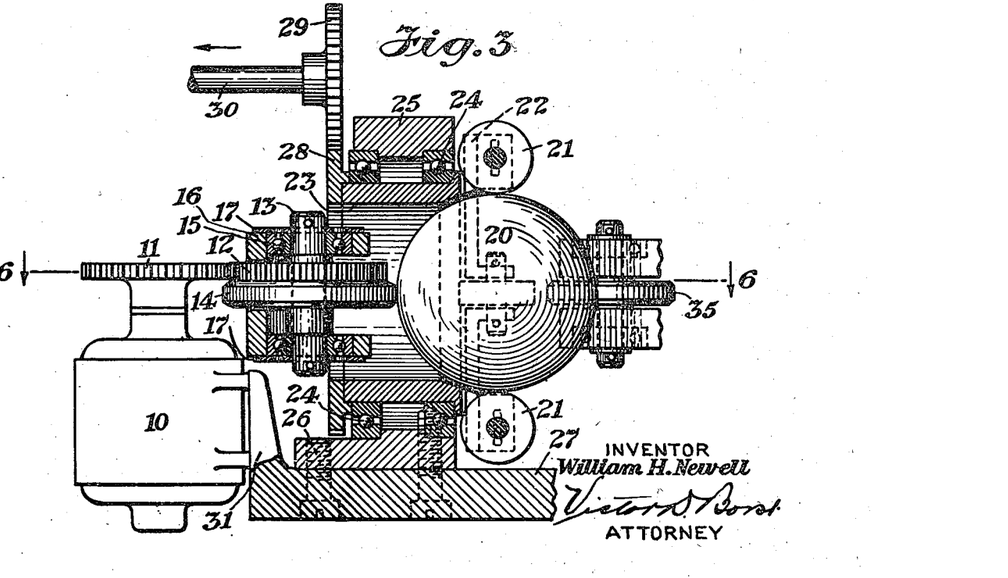
Fig. 3 is a longitudinal section taken on the line 3—3 of Fig. 1 showing the drive mechanism.

Referring to Figs. 1 and 3, the invention is shown as applied to a ball integrator which is driven at a constant speed by a motor 10 on the shaft of which is mounted a gear 11. The gear 11 drives the integrator through a gear 12 which is mounted on a shaft 13 which carries a driving roller 14 and is journalled in bearings 15 held in a bracket 16. End plates 17 attached to the bracket 16 hold the bearings 15 in place.

Figure 7:
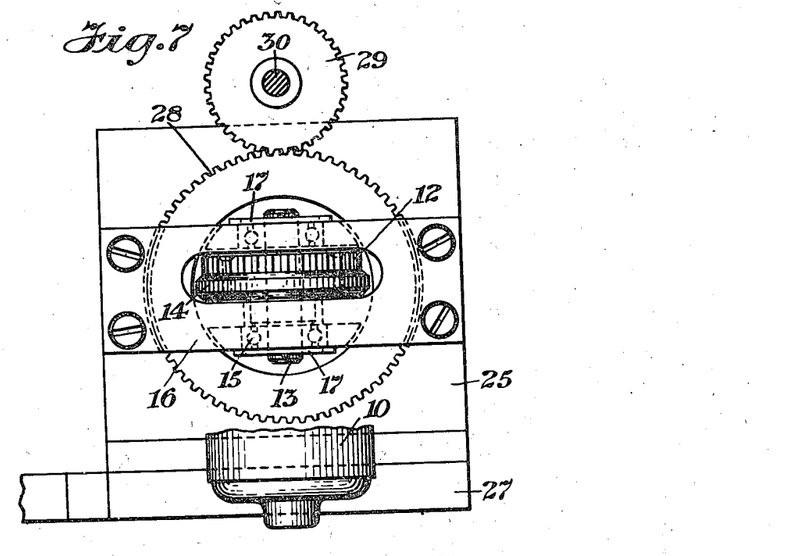
Fig. 7 is a left side elevation of the drive mechanism of Fig. 3.

The driving roller 14 engages the surface of a ball 20 which engages and is free to rotate between confining rollers 21 which are carried in a cage 22 having a hollow hub 23 which is journalled in bearings 24 to rotate in a stationary frame 25 attached by screws 26 to the base 27. The bracket 16 is secured to the frame 25 so that the driving roller 14 engages the ball 20 at a point lying in the axis of the hub 23. The hub 23 carries a gear 28 meshing with a gear 29 on a shaft 30 (see Figs. 3 and 7) of the mechanism which is to be driven by the integrator.

The confining rollers 21 are mounted on cage 22 to rotate about axes which lie in the same diametrical plane of the ball 20 and are normal to the radii of the ball passing through the respective points of contact of the rollers 21 with the surface of the ball. Four rollers 21 have been shown although other numbers may be used if desired and spaced to confine the ball 20 to rotate therebetween. The cage 22 rotates about an axis which is normal to said plane and coincides with a diameter of the ball. The motor 10 is mounted on a bracket 31 extending from the base 27.

Figure 2:
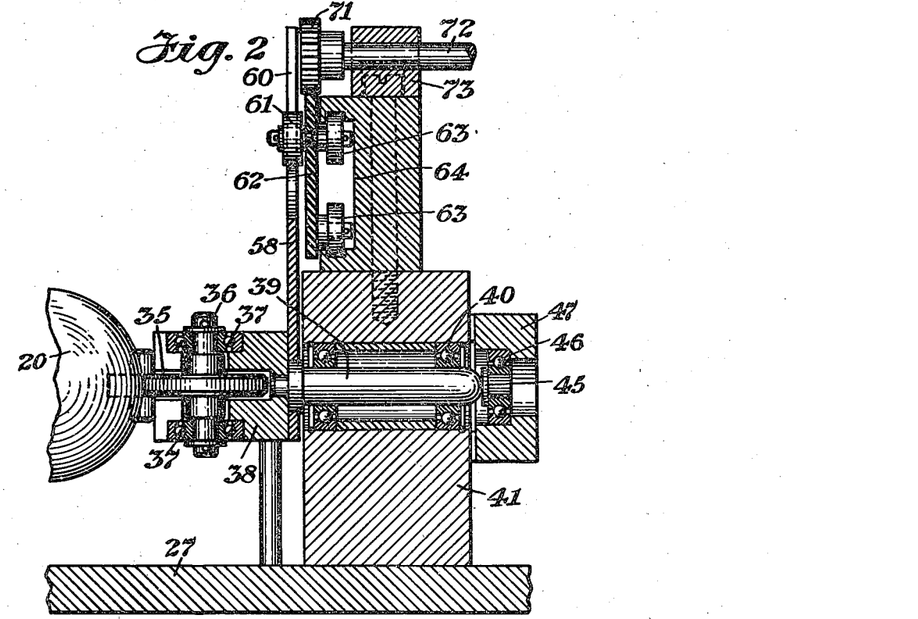
Fig. 2 is a longitudinal section taken on the line 2—2 of Fig. 1 showing the steering roller mechanism.

The ball 20 engages a steering roller 35, Figs. 1 and 2, which is mounted on a shaft 36 journalled in bearings 37 in a bracket 38. The bracket 38 is attached to a pin 39 which is mounted for rotation in bearings 40 mounted in a frame 41 attached to the base 27.

The rollers 35 and 14 are held in contact with the surface of the ball 20 by a thrust member comprising a button 45 mounted in a bearing 46 in a cross arm 47 which is pivoted by means of a pin 48 in an ear extending from the frame 41. The button 45 is held in pressure engagement with the end of the pin 39 by a spring 49 which extends between a pin 50 mounted in ears 51 of the cross arm 47 and a stationary stud 52 attached to the base 27.

Figure 4:
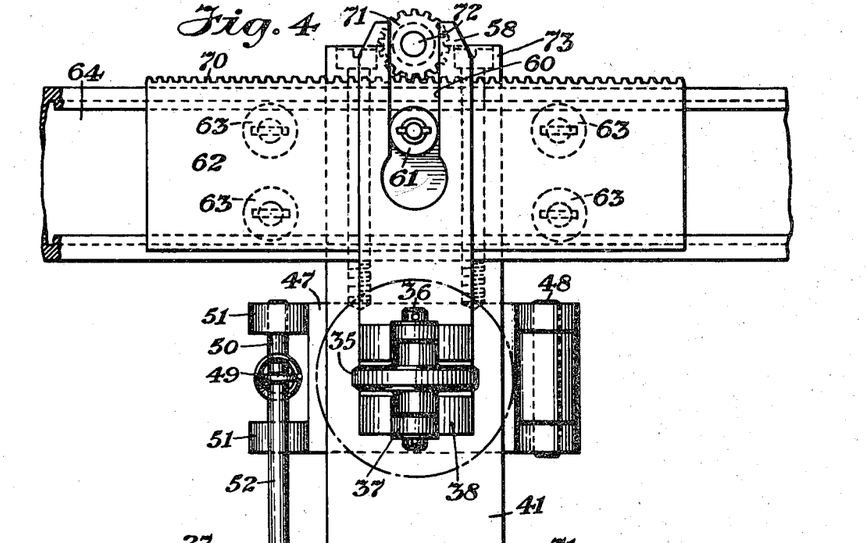
Fig. 4 is a transverse section taken on the line 4—4 of Fig. 1 showing the control mechanism for the steering roller.
Figure 5:
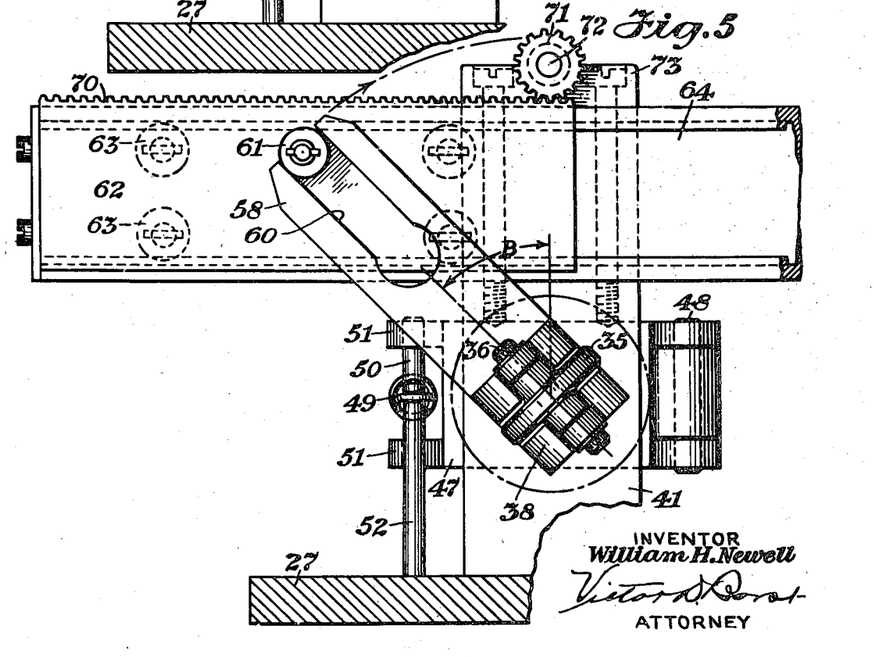
Fig. 5 is a transverse section similar to Fig. 4 showing the control mechanism in a different position.

The position of the steering roller 35 is controlled by an arm 58, Figs. 2, 4 and 5, which is attached to the bracket 38 and has a bifurcated end forming a slot 60 engaging a roller 61 mounted on a slide 62. The slide 62 is carried by rollers 63 which roll in a track formed by a channel member 64 attached to the frame 41. The slide 62 is formed with a rack 70 which is engaged by a pinion 71 mounted on a shaft 72 journalled in a bracket 73 attached to the channel member 64.

In the operation of the above described integrator the driving roller 14, which is driven by the motor 10, represents one of the inputs of the integrator, for example, time. The ball 20 is driven by the driving roller 14. In order to have true rolling contact with both the driving and driven rollers the ball must always rotate about an axis which lies in the line of intersection of the diametrical planes $d$ and $s$ of the ball 20 containing the axes of the driving roller 14 and the steering roller 35 respectively. With the steering roller 35 in the position shown in Figs. 1, 2, 4 and 11 the ball 20 rotates about an axes parallel to the axis of the rollers 14 and 35 as indicated by the circle $o$ at the intersection of the planes $d$ and $s$ in Fig. 11. In this position of the steering roller the axis $o$ lies in the plane containing the axes of the rollers 21 and it will be seen from Fig. 11 that although there is a component of motion of the ball 20 which may cause the rollers 21 to rotate on their axes there is no component of motion of the ball tending to rotate the cage 22.

The rate input to the integrator is applied to the shaft 72 which through the pinion 71 drives the rack 70 and slide 62 to the right or left of the position shown in Fig. 4, for example, to the position shown in Fig. 5. As the slide 62 is shifted laterally the roller 61 causes the arm 58 and the steering roller 35 to pivot about the axis of the pin 39 through the angle B which is the angle whose tangent is proportional to the distance the slide 62 is displaced from its central position. This new position of the steering roller 35 changes the axis of rotation of the ball 20 to the position indicated by the circles $o$ in Fig. 12, that is, the intersection line of planes $d$ and $s$.

Figures 6, 11, 12:
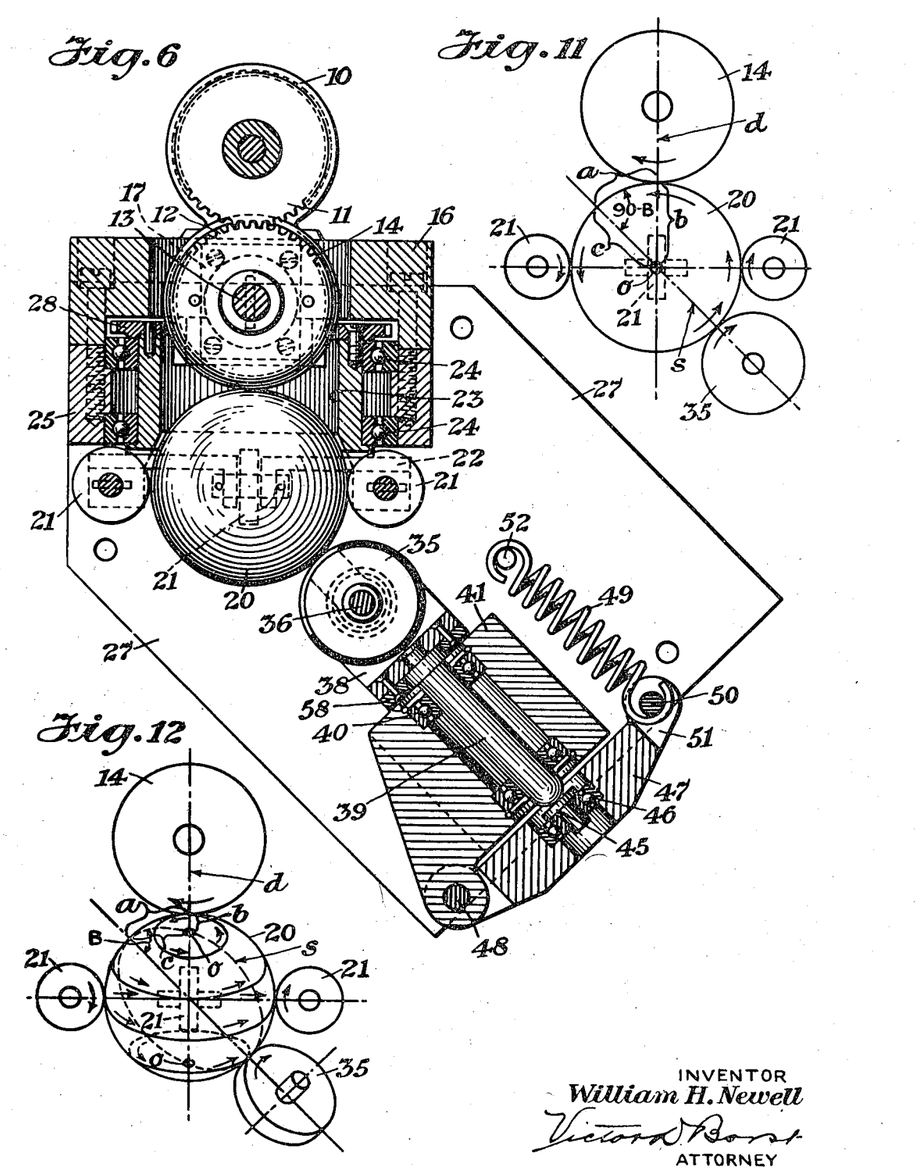
Fig. 6 is a section taken on the line 6—6 of Fig. 3.
Figs. 11 and 12 are diagrammatic views illustrating the operation of the embodiment of the invention shown in Figs. 1 to 7.

Inasmuch as this new axis no longer lies in the plane containing the axes of the rollers 21, there is a component of the rotary movement of the ball 20 which causes the cage 22 to rotate about its axis, thereby driving the gears 28 and 29 and the shaft 30 to represent the output from the integrator.

The movement of the cage 22 is a measure of the rate represented by the position of the input shaft 72 integrated against the value represented by the rotation of the driving roller 14.

Referring to the spherical right triangle, shown on Figs. 11 to 14, having the sides $a$, $b$ and $c$, it will be seen that;

(1) $$\operatorname{Tan} b = \frac{\sin a}{\cot (90-B)} = \frac{\sin a}{\tan B}$$

in which $a$ is the angle between the axes of the ball passing through the points of contact of the driving roller and the steering roller respectively.

$b$ is the angular displacement of the axis of rotation $o$ of the ball in the plane $d$ from the point of contact of the driving roller with the ball;

$c$ is the angular displacement of the axis of rotation $o$ of the ball in the plane $s$ from the axis of the ball passing through the point of contact of the steering roller with the ball, and B is the angle of displacement of the steering roller from its central or zero rate position.

The equation expressing the angular velocity of the ball due to the angular velocity of the driving roller and the angular position of the steering roller may be expressed by the following equation:

(2) $$V_B \sin b = k V_R \quad \text{or} \quad V_B = V_R \frac{k}{\sin b}$$

where $V_B$ equals the angular velocity of the ball, $V_R$ equals the angular velocity of the driving roller, and $k$ equals the diameter of the driving roller divided by the diameter of the ball.

Referring now to Figs. 11 and 12 only it will be seen that, (3) $$V_C = V_B \cos b$$

in which $V_C$ equals the angular velocity of the cage.

Substituting (2) in (3)

(4) $$V_C = V_R \frac{k}{\sin b} \cos b \quad \text{or} \quad V_C = V_R \frac{k}{\tan b}$$

Substituting (1) in (4)

(5) $$V_C = V_R \frac{k}{\sin a} \tan B$$

Since $a$ is a constant for a particular unit, (6) $$V_C = k_1 V_R \tan B$$

in which $$k_1 = \frac{k}{\sin a}$$

The ratio of the instantaneous angular velocity of the cage to the instantaneous angular velocity of the driving roller therefore may be expressed as follows:

(7) $$\frac{V_C}{V_R} = k_1 \tan B$$

Since tan B is represented by the displacement of the slide 62 the velocity of the cage for a given velocity of the input roller is proportional to the displacement of the slide 62 from its central position.

Figure 8:
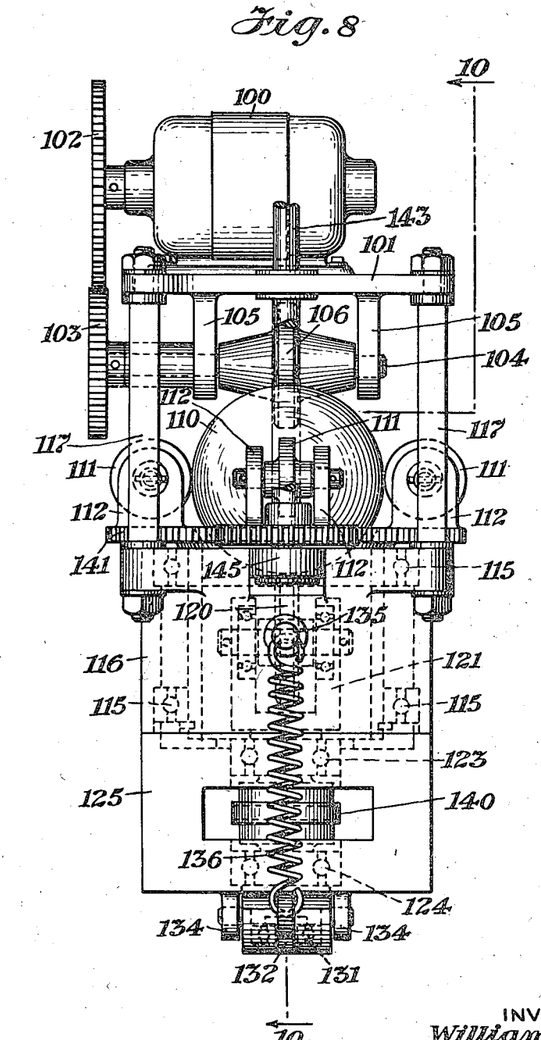
Fig. 8 is a left side elevation of a ball integrator illustrating a different embodiment of the invention.
Figures 9, 10:
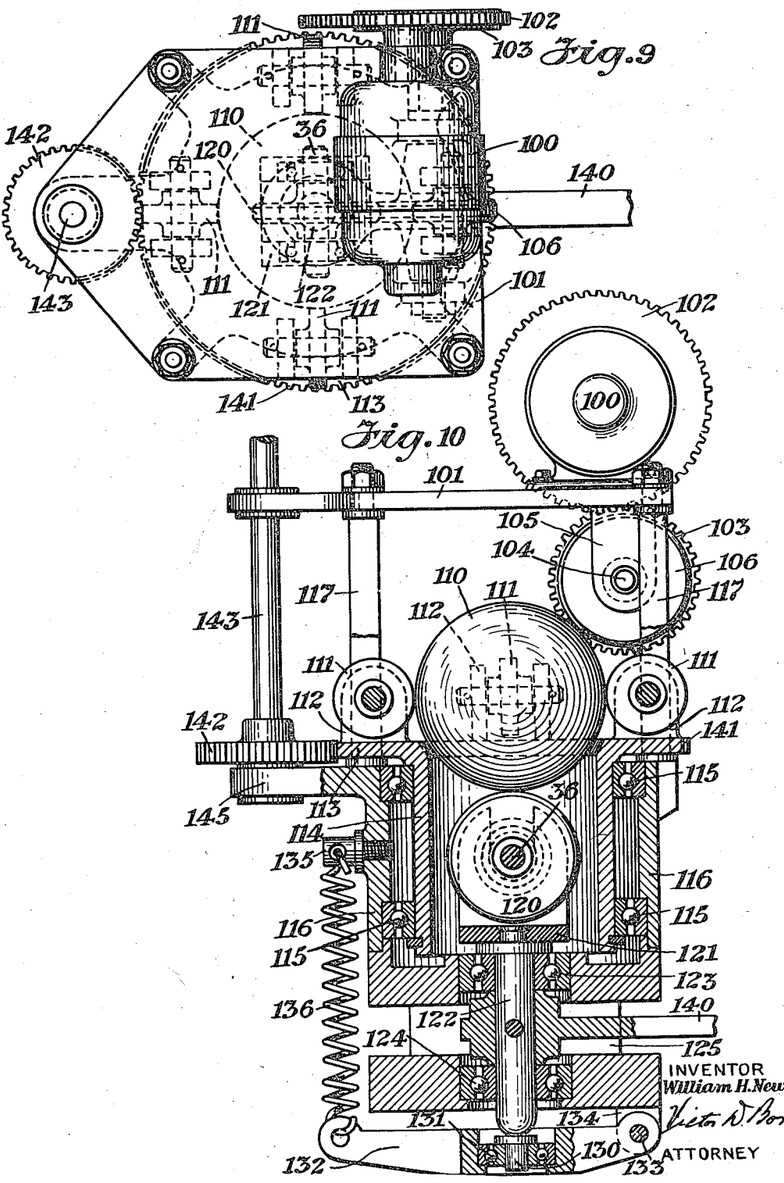
Fig. 9 is a plan view of the integrator of Fig. 8.
Fig. 10 is a longitudinal section taken along the line 10—10 of Fig. 8.

Referring now to the embodiment of Figs. 8 to 10, a driving motor 100 is shown as mounted on a plate 101 and driving a gear 102 which meshes with a gear 103 attached to a shaft 104 which is journalled in brackets 105 carried by the plate 101 and which carries a driving roller 106.

The driving roller 106 drives a ball 110 which rotates between confining rollers 111 mounted on brackets 112 carried on a cage 113 (Fig. 10) which is attached to a hub 114 journalled in bearings 115 in a frame 116. The frame 116 carries posts 117 which support the plate 101.

A steering roller 120 is mounted for rotation in a bracket 121 carried by a pin 122 which is journalled in bearings 123 and 124 in a frame 125 attached to the frame 116. A thrust bearing is provided which comprises a button 130 mounted in a bearing 131 in an arm 132 which is pivoted by a pin 133 to ears 134 attached to the frame 125 and is held against the end of the pin 122 by a spring 136 which extends between the free end of the arm 132 and a pin 135 secured to the frame 116.

An arm 140 is secured to the pin 122. The arm corresponds to the arm 58 of Figs. 1 to 7 and may be provided with a similar rack and pinion for determining the angular position thereof. The cage 113 is provided with gear teeth 141 meshing with a gear 142 attached to an output shaft 143 which is journalled in the plate 101 and a bracket 145 extending from the frame 116. The relationship of the various rollers and the cage with respect to the ball 110 is similar to that set forth in connection with Figs. 1 to 7 except that the axis of the hub 114 and the cage 113 is concentric with the axis of the pin of the steering roller 120 instead of the axis of the ball passing through the point of contact of the driving roller with the ball.

The operation of the embodiment shown in Figs. 8 and 10 is similar to that above described. The driving roller 106 is rotated by the gears 102 and 103 and the motor 100. The angular position of the axis of rotation of the ball 110 is determined by the relative positions of the driving roller 106 and the steering roller 120, and, as in the above case, is the line of intersection of the diametrical planes $d$ and $s$ of the ball 110 containing the axes of the rollers 106 and 120 respectively. When the axis of rotation of the ball 110 does not lie in the plane containing the axes of the confining rollers 111, there is a component of motion of the ball causing rotation of the cage 113 which drives the gear 142 and the shaft 143 attached thereto. The movement of the shaft 143 represents the rate corresponding to the position of the arm 140 integrated against the value represented by the rotation of the driving roller 106.

Figure 13:
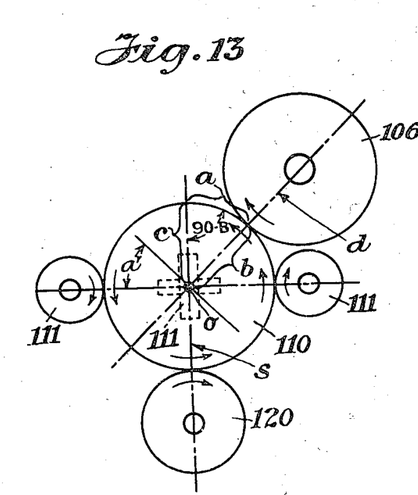
Figs. 13 and 14 are diagrammatic views illustrating the operation of the embodiment shown in Figs. 8 to 10.
Figure 14:
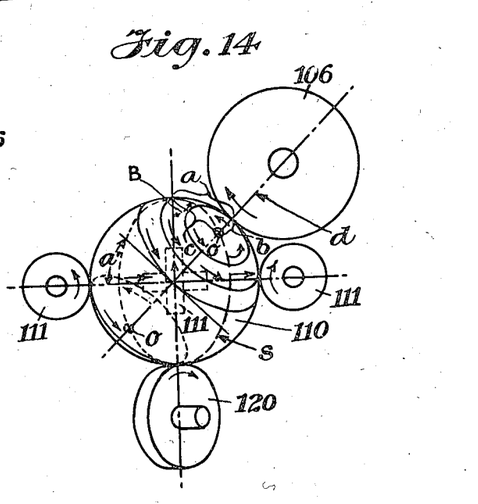

By reference to Figs. 13 and 14 it will be seen that the component of movement of the ball causing rotation of the cage may be expressed by the equation, (8) $\quad V_{C'} = V_B \cos b \cos a'$ in which $V_{C'}$ is the angular velocity of the cage and $a'$ is the angle between the plane of the cage and a plane normal to the plane $d$.

Substituting (2) in (8)

(9) $\quad V_{C'} = V_R \dfrac{k}{\sin b} \cos b \cos a'$ or $$V_{C'} = V_R \dfrac{k}{\tan b} \cos a'$$

Substituting (1) in (9)

(10) $\quad V_{C'} = V_R \dfrac{k}{\sin a} \tan B \cos a'$

Since $a$ and $a'$ are constants for a particular unit (11) $\quad V_{C'} = k_2 V_R \tan B$ in which $$k_2 = \dfrac{k}{\sin a} \cos a'$$

The ratio of the instantaneous angular velocity of the cage to the instantaneous angular velocity of the driving roller therefore may be expressed as follows:

(12) $\quad \dfrac{V_{C'}}{V_R} = k_2 \tan B$

It will be noted that for the construction represented by Figs. 11 and 12 Equation 10 becomes Equation 5 because $a'$ is $o$ and $\cos a'$ is 1.

It has been shown that the movement of the cage 22 of Figs. 1 to 7 and of the cage 113 of Figs. 8 to 10 represents the integrated output of the device. In Fig. 1, the plane containing the axes of rollers 21 is normal to the diameter of ball 20 extending through the point of contact of the surface of the ball with the driving roller 14, whereas in Fig. 10 the plane containing the axes of rollers 111 is normal to the diameter of the ball 110 extending through the point of contact of the surface of the ball with the steering roller 120. It will be obvious from Equation 12 that the same relationship except for the constant of the equation will hold if the plane containing the axes of the confining rollers extends at other angles $a'$ and that the value of this angle $a'$ is dependent only upon mechanical limitations of design. In both embodiments shown the components of rotation of the ball normal to the plane of the cage cause rotation of the confining rollers about their respective axes.

Although specific embodiments of the invention have been shown for purposes of illustration, it is to be understood that the invention is capable of various uses and that changes and modifications may be made therein as will be readily apparent to a person skilled in the art. The invention is only to be restricted in accordance with the scope of the following claims.

What is claimed is:

1. A variable speed device comprising a ball, a driving roller engaging the surface of said ball and driving the same at a controlled rate, a steering roller engaging the surface of said ball and mounted for orientation of its axis of rotation about an axis extending through the center of said ball and the point of contact of the surface of said ball with said steering roller, input means to control the orientation of the axis of said steering roller, a plurality of confining rollers engaging the surface of said ball with their axes of rotation lying in the same diametrical plane of said ball, and an output member carrying said confining rollers and mounted for rotation about a diameter of said ball normal to said plane and lying in the diametrical plane of said ball containing the points of contact of the surface of said ball with said first rollers.

2. A variable speed device comprising a ball, means driving the same at a controlled rate, a steering roller engaging the surface of said ball and mounted for orientation of its axis of rotation about an axis extending through the center of said ball and the point of contact of the surface of said ball with said steering roller, input means to control the orientation of the axis of said steering roller, a plurality of confining rollers engaging the surface of said ball with their axes of rotation lying in the same diametrical plane of said ball, and an output member carrying said confining rollers and mounted for rotation about the axis of orientation of said steering roller.

3. A variable speed device comprising a ball, a driving roller engaging the surface of said ball and driving the same at a controlled rate, a steering roller engaging the surface of said ball and mounted for orientation of its axis of rotation about an axis extending through the center of said ball and the point of contact of the surface of said ball with said steering roller, input means to control the orientation of the axis of said steering roller, a plurality of confining rollers engaging the surface of said ball with their axes of rotation lying in the same diametrical plane of said ball, and an output member carrying said confining rollers and mounted for rotation about a diameter of said ball normal to said plane and passing through the point of contact of the surface of said ball with said driving roller.

4. A variable speed device comprising a ball, means driving the same at a controlled rate, a steering roller engaging the surface of said ball and mounted for orientation of its axis of rotation about an axis extending through the center of said ball and the point of contact of the surface of said ball with said steering roller, an arm pivoted about said last axis to control the orientation of the axis of said steering roller, a slide to control the position of said arm, an input member controlling the position of said slide, a plurality of confining rollers engaging the surface of said ball with their axes of rotation lying in the same diametrical plane of said ball, and an output member carrying said confining rollers and mounted for rotation about a diameter of said ball normal to said plane.

5. A variable speed device comprising a ball, means driving the same at a controlled rate, a steering roller engaging the surface of said ball, a roller support carrying said roller and mounted for orientation about an axis extending through the center of said ball and the point of contact of the surface of the ball with said steering roller, an arm attached to said support, a slide mounted for movement normal to said arm when said arm is in a predetermined mid-position, connections to control said arm by said slide, a rotary driving member engaging said slide to actuate the same, a plurality of confining rollers engaging the surface of said ball with their axes of rotation lying in the same diametrical plane of said ball, and an output member carrying said confining rollers and mounted for rotation about a diameter of said ball normal to said plane.

6. A variable speed device comprising a ball, means driving the same at a controlled rate, a steering roller engaging the surface of said ball, a roller support carrying said roller and mounted for orientation about an axis extending through the center of said ball and the point of contact of the surface of the ball with said steering roller, an arm attached to said support, a slide mounted for movement normal to said arm when said arm is is a predetermined mid-position, connections to control said arm by said slide, a rack on said slide, a rotary gear driving said rack to thereby control the orientation of the axis of said steering roller, a plurality of confining rollers engaging the surface of said ball with their axes of rotation lying in the same diametrical plane of said ball, and an output member carrying said confining rollers and mounted for rotation about a diameter of said ball normal to said plane.

7. An integrator comprising a ball, a driving roller engaging the surface of said ball and driving the same, a motor driving said driving roller, a steering roller engaging the surface of said ball, a roller support carrying said steering roller and mounted for orientation about an axis extending through the center of said ball and the point of contact of the surface of the ball with said steering roller, an arm attached to said support, a slide mounted for movement normal to said arm when said arm is in a predetermined mid-position, connections to control said arm by said slide, a rotary driving member engaging said slide to actuate the same, a plurality of confining rollers engaging the surface of said ball with their axes of rotation lying in the same diametrical plane of said ball, and an output member carrying said confining rollers and mounted for rotation about a diameter of said ball normal to said plane.

8. A variable speed device comprising a ball, a driving roller in contact with the surface of said ball, a steering roller in contact with the surface of said ball, means mounting said steering roller for orientation of its axis of rotation about an axis extending radially from the ball at the point of contact of the steering roller, an output member mounted for rotation about an axis extending radially from the ball and lying in the diametrical plane of the ball containing the points of contact of the driving and steering rollers, and a plurality of confining rollers mounted on the output member in contact with the surface of the ball and having their axes of rotation lying in the diametrical plane of the ball which is perpendicular to the axis of rotation of the output member.

9. A variable speed device comprising a ball, a driving roller in contact with the surface of said ball, a steering roller in contact with the surface of said ball, means mounting said steering roller for orientation of its axis of rotation about an axis extending radially from the ball at the point of contact of the steering roller, an output member mounted for rotation about an axis extending radially from the ball and lying in the diametrical plane of the ball containing the points of contact of the driving and steering rollers, a plurality of confining rollers mounted on the output member in contact with the surface of the ball and having their axes of rotation lying in the diametrical plane of the ball which is perpendicular to the axis of rotation of the output member, and yieldable means for maintaining the said driving and steering rollers in contact with the ball.

10. A variable speed device comprising a ball, a driving roller in contact with the surface of the said ball, a steering roller in contact with the surface of said ball, means mounting said steering roller for orientation of its axis of rotation about an axis extending radially from the ball at the point of contact of the steering roller, an output member mounted for rotation about an axis aligned with the axis of orientation of the steering roller, and a plurality of confining rollers mounted on the output member in contact with the surface of the ball and having their axes of rotation lying in the diametrical plane of the ball which is perpendicular to the axis of rotation of the output member.

11. A variable speed device comprising a ball, a driving roller in contact with the surface of said ball, a steering roller in contact with the surface of said ball, means mounting said steering roller for orientation of its axis of rotation about an axis extending radially from the ball at the point of contact of the steering roller, an output member mounted for rotation about an axis extending radially from the ball at the point of contact of the driving roller, and a plurality of confining rollers mounted on the output member in contact with the surface of the ball and having their axes of rotation lying in the diametrical plane of the ball which is perpendicular to the axis of rotation of the output member.

12. A variable speed device comprising a ball, a driving roller in contact with the surface of said ball, a steering roller in contact with the surface of said ball, means mounting said steering roller for orientation of its axis of rotation about an axis extending radially from the ball at the point of contact of the steering roller, an output member mounted for rotation about an axis aligned with the axis of orientation of the steering roller, a plurality of confining rollers mounted on the output member in contact with the surface of the ball and having their axes of rotation lying in the diametrical plane of the ball which is perpendicular to the axis of rotation of the output member, and yieldable means for maintaining the said driving and steering rollers in contact with the ball.

13. A variable speed device comprising a ball, a driving roller in contact with the surface of said ball, a steering roller in contact with the surface of said ball, means mounting said steering roller for orientation of its axis of rotation about an axis extending radially from the ball at the point of contact of the steering roller with the ball, an output member mounted for rotation about an axis extending radially from the ball at the point of contact of the driving roller, a plurality of confining rollers mounted on the output member in contact with the surface of the ball and having their axes of rotation lying in the diametrical plane of the ball which is perpendicular to the axis of rotation of the output member, and yieldable means for maintaining the said driving and steering rollers in contact with the ball.

14. A variable speed device comprising a ball, a rotatable driving member in contact with the surface of said ball, a rotatable steering member in contact with the surface of said ball, means mounting said steering member for orientation of its axis of rotation, an output member mounted for rotation about an axis extending radially from the ball and lying in the diametrical plane of the ball containing the points of contact of the driving and the steering members, and a plurality of confining rollers mounted on the output member in contact with the surface of the ball and having their axes or rotation lying in the diametrical plane of the ball which is perpendicular to the axis of rotation of the output member.

15. A variable speed device comprising a ball, a rotatable driving member in contact with the surface of said ball, a rotatable steering member in contact with the surface of said ball, means mounting said steering member for orientation of its axis of rotation, an output member mounted for rotation about an axis extending radially from the ball and lying in the diametrical plane of the ball containing the points of contact of the driving and the steering members, a plurality of confining rollers mounted on the output member in contact with the surface of the ball and having their axes of rotation lying in the diametrical plane of the ball which is perpendicular to the axis of rotation of the output member, and yieldable means for maintaining said driving and steering members in contact with the ball.

16. A variable speed device comprising a ball, a driving roller in contact with the surface of said ball, a steering roller in contact with the surface of said ball, means mounting said steering roller for orientation of its axis of rotation about an axis extending radially from the ball at the point of contact of the steering roller, an arm extending radially from said mounting means, an input member slidably connected to the arm and movable in the plane of movement of the arm in a direction perpendicular to the position of the arm when the axis of rotation of the steering roller is parallel to the axis of rotation of the driving roller, an output member mounted for rotation about an axis extending radially from the ball and lying in the diametrical plane of the ball containing the points of contact of the driving and steering rollers, and a plurality of confining rollers mounted on the output member in contact with the surface of the ball and having their axes of rotation lying in the diametrical plane of the ball which is perpendicular to the axis of rotation of the output member.

17. A variable speed device comprising a ball, a driving roller in contact with the surface of said ball, a steering roller in contact with the surface of said ball, means mounting said steering roller for orientation of its axis of rotation about an axis extending radially from the ball at the point of contact of the steering roller, a radial arm extending from said mounting means, an input member slidably connected to the arm and movable in the plane of movement of the arm in a direction perpendicular to the position of the arm when the axis of rotation of the steering roller is parallel to the axis of rotation of the driving roller, an output member mounted for rotation about an axis extending radially from the ball and lying in the diametrical plane of the ball containing the points of contact of the driving and steering rollers, a plurality of confining rollers mounted on the output member in contact with the surface of the ball and having their axes of rotation lying in the diametrical plane of the ball which is perpendicular to the axis of rotation of the output member, and yieldable means for maintaining the said driving and steering rollers in contact with the ball.

WILLIAM H. NEWELL.